July 6, 1954 — W. G. HOELSCHER — 2,682,933

CLAMPING MECHANISM FOR MACHINE TOOLS

Filed Dec. 5, 1950 — 2 Sheets-Sheet 1

INVENTOR.
William G. Hoelscher
BY
Wood, Arey, Herron & Evans
ATTORNEYS.

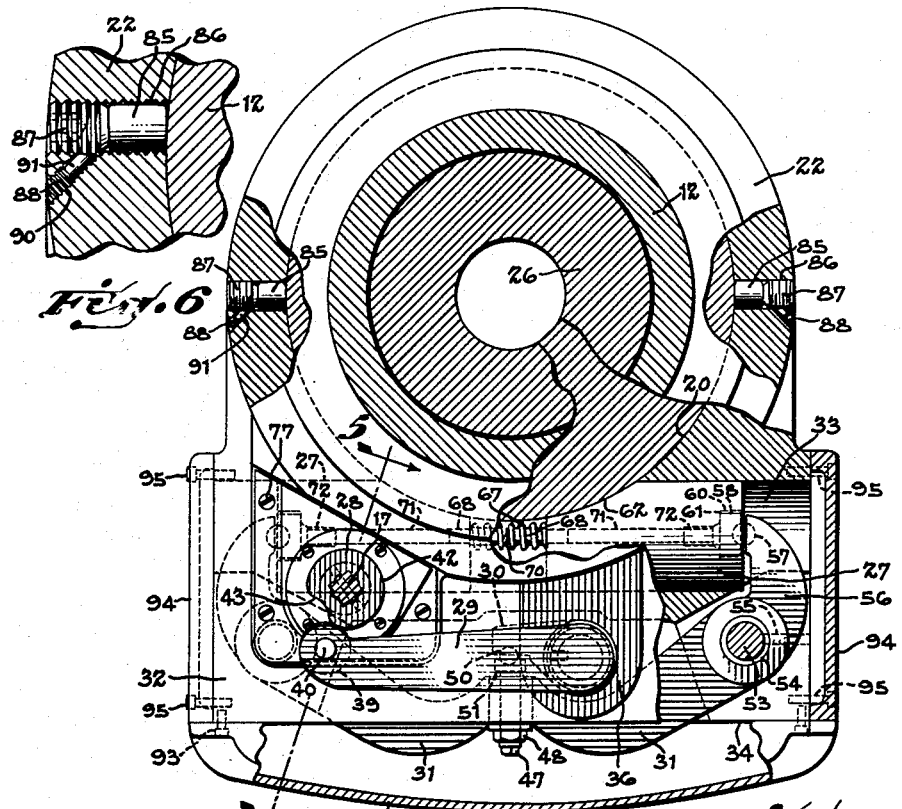
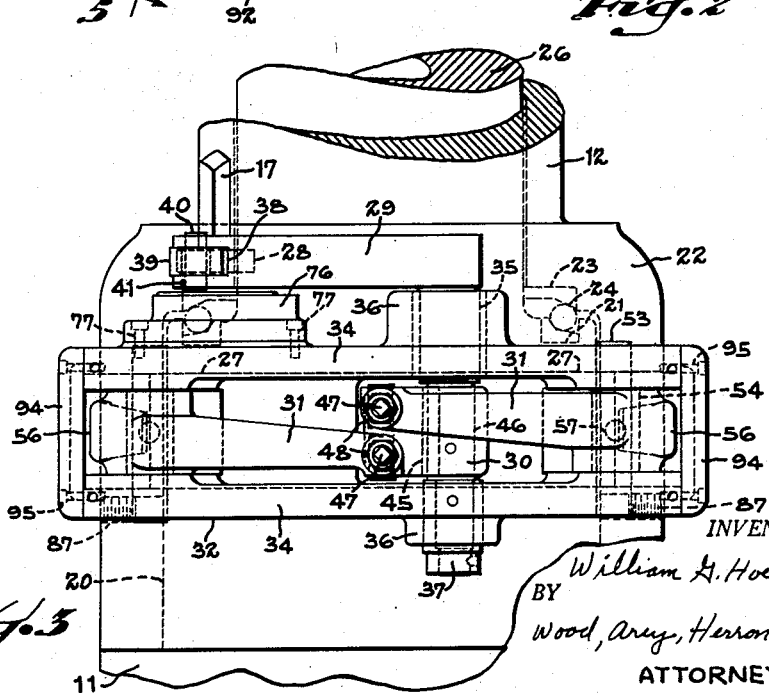

Patented July 6, 1954

2,682,933

UNITED STATES PATENT OFFICE 2,682,933

CLAMPING MECHANISM FOR MACHINE TOOLS

William G. Hoelscher, Cincinnati, Ohio, assignor to The American Tool Works Company, Cincinnati, Ohio, a corporation of Ohio Application December 5, 1950, Serial No. 199,324

6 Claims. (Cl. 188—75)

1

This invention relates to an improved clamping mechanism intended primarily for clamping the column of a radial drill rigidly against rotation with respect to the base upon which it is rotatably mounted. The mechanism is disclosed in its preferred embodiment as part of a radial drill column; however, the structure, without substantial alteration, can be used as an arm clamp and also for general utility in machine tools having movable parts which must be clamped rigidly in adjusted position with respect to stationary parts of the machine.

Radial drills of the type embracing clamping mechanism consist generally of a base for mounting the work, a column rotatably mounted on the base, and an arm slidable vertically upon the column but fixed against rotation, the column itself being rotatable relative to the base. A drill head, which mounts the drill, is translatably supported for horizontal movement upon the arm; therefore, the arm and column to which it is keyed, can be swung radially, and the head can be translated horizontally along the arm to align the drill with the various hole centers or bushings which are located upon the work. In order to permit column rotation, the lower end of the column is journalled upon a stump fixed to the base; and the column clamp is arranged to provide a clamping engagement between the lower end of the column and stump so that the column and arm can be clamped rigidly in adjusted position with respect to the base during the drilling operation so as to drill, and if necessary, tap a series of holes precisely located upon the work.

One well known clamping arrangement consists of splitting the lower end of the column which embraces the stump and providing levers or other means to contract the split column sections into pressure engagement with the stump. Since the rigidity of a machine tool is a factor which contributes directly to its operating precision, splitting the column even partially at its pivoted load bearing end, is undesirable because it tends to weaken the structure. Also, the frictional engagement of the clamping sections against the stump is apt to be unequal, causing the sections to exert a turning force against the stump which is manifested by deflection of the arm from its adjusted position when clamping pressure is applied. In extreme cases column creep may deflect the arm as much as $\frac{1}{32}''$ from its adjusted position, but even if less, it interferes seriously with efficient drilling and tapping operations.

The problem of lubricating a split column also is difficult because the oil film between the stump

2 and clamping sections is squeezed out when the column sections are contracted into frictional engagement with the stump. Efforts have been made to retain the lubricant by installing compressible gaskets in the slot or slots which delineate the clamping sections; this arrangement has not met with a great deal of success because the gaskets, after a period of useful service, lose their elasticity and fail.

A principal object of the invention has been to provide a clamp structure which solves the above problems by eliminating the splitting of the lower end of the column and instead, utilizing it as an integral bearing hub which is rotatably journalled upon the stump so that it retains its natural strength and concentricity and establishes a snug bearing engagement with the stump. Instead of splitting the hub to provide contraction, clamping is accomplished by a pair of wedging shoes which are symmetrically located on opposite sides of the stump and slidably maintained in bores formed in the hub portion of the column which embraces the stump. The bores are disposed on an axis which is substantially tangent to the periphery of the stump and the respective inner ends of the clamping shoes are shaped to conform to the periphery of the stump and establish a wedging engagement therewith when the shoes are forced inwardly. Creeping of the column is eliminated by forcing the shoes simultaneously toward each other in such a manner that the turning force developed by the wedging of one shoe, reacting to turn the column relative to the stump, is opposed by the turning force developed in the opposite direction by the other shoe.

Another object has been to provide a compound lever system pivoted within a clamp housing forming a part of the column hub in order to provide a strong rigid structure arranged to protect the mechanism from dust and grit. By the improved lever system, a considerable increase in leverage is developed with relatively short levers which are pivotally mounted between spaced flanges constituting the walls of the clamp housing. This localizes the clamping stresses within the housing so as to produce a strong rigid structure.

The leverage system includes a primary lever and a pair of opposed secondary levers having their ends connected in common with the primary lever for unitary operation. The opposite ends of the secondary levers include pressure arms extending a short distance beyond the fulcrum points into pressure engagement against the outer ends of the clamping shoes.

In order to reduce friction and binding due to the relative lateral displacement between the shoes and swinging pressure arms, laterally slidable disks are interposed between the arms and shoes. When the arms swing toward each other during the clamping movement, they are displaced laterally due to their arc of swing, and the disks accommodate this movement by sliding transversely with respect to the shoes while transmitting the arm pressure to them.

The arms make contact at the central axis of the cylindrical shoes so that the force is evenly distributed. The cylindrical shoes are free to rotate in their bores to minimize frictional losses and to allow the shoes to locate their wedging faces properly against the stump. Bearing balls are interposed between the pressure arms and the laterally floating disks to transmit clamping pressure from the arms to the shoes. These balls prevent turning forces from being transmitted from the arms to the clamping shoes and thus in combination with the disks, further reduce operating resistance and binding.

A structure following the above outlined concept is disclosed in the copending application of William G. Hoelscher, Serial No. 113,597, filed on September 1, 1949, now abandoned. In this previously filed application, the clamping shoes are forced in clamping direction by a cam operated, compound reduction lever system similar to the present arrangement. In addition, however, the shoes are maintained by pre-loading springs under a controlled pressure engagement against the stump to provide a constant drag or turning resistance when the mechanism is unclamped. The purpose of this arrangement is to prevent the column from creeping when the clamping pressure is applied and also to permit small holes to be drilled without first clamping the column.

After this structure was placed in operation it was discovered that the apparatus could be operated more efficiently if the clamping shoes were forced, in a positive manner, to unclamping position when clamping pressure is relieved. In other words, the shoes, by their wedging action and spring loading, had a tendency to bind temporarily in clamping position after the clamping pressure against them was removed. This created an initial turning resistance and required the operator to apply considerable force against the arm to loosen the shoes before turning the column to a new position. The turning force applied to the column forced the shoes in unclamping direction sufficiently to break loose their binding engagement after which the springs were again effective to produce the controlled turning resistance. However, the necessity of loosening the column in this manner was undesirable especially when the drill was used in production operations.

Accordingly it is a further object of the invention to provide a structure which, in a positive manner, eliminates the initial binding of the clamping shoes so as to allow the arm to be swung to a new position without undue resistance and at the same time, to retain a predetermined drag resistance upon the column to hold it against creeping when it is reclamped. For this purpose, the pre-loading springs have been omitted from the clamping shoes and instead, a relatively heavy compression spring is interposed between their inner ends to force them constantly in unclamping direction and thus to free the column immediately when clamping pressure is relieved.

Turning resistance is applied to the column by means of brake plugs passing through the column into frictional engagement against the stump. These plugs are remote from the clamping shoes and operate independently of them such that the shoes may be clamped and unclamped in a positive manner, while at the same time, the brake plugs perform their function without interfering with the movements of the clamping shoes.

From the foregoing, taken in conjunction with the specification and drawings, those skilled in the art will comprehend various other features and advantages and the various modifications to which the invention is susceptible.

In the drawings:

Figure 2 is an enlarged sectional view taken on line 2—2, Figure 1, detailing the improved clamping mechanism at the base of the column.

Figure 3 is an enlarged fragmentary view projected from Figure 2, with the main cover plate removed to illustrate in further detail the construction of the clamping mechanism.

Figure 6 is an enlarged fragmentary view detailing one of the brake plugs shown in Figure 2.

Figure 1:
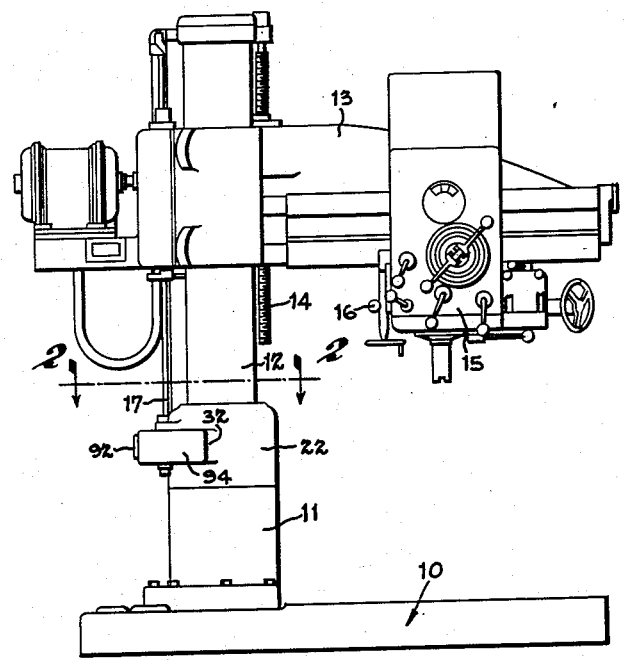
Figure 1 is a general side elevation illustrating a radial drill incorporating the improved column clamp.

In Figure 1, the radial drill illustrating a preferred embodiment of the invention, consists generally of a base 10 having a stump 11 which is preferably bolted to the base for rotatably supporting a column 12 which rises vertically from the stump. A horizontal drill arm 13 extends radially from the column and is slidably keyed to the column; and the arm is moved vertically with respect to the column by means of the usual power driven elevating nut (not shown), mounted in the arm and threaded on the screw 14. A drill head 15 is mounted translatably upon the arm so that the drill, which extends downwardly from the head, may be adjusted horizontally with respect to a work piece resting upon the base.

Vertical movements of the arm with respect to the column are controlled in the usual manner by a lever which regulates the power transmission to the elevating nut and coincidentally clamps the arm to the column in adjusted position. The drill head is translated relative to the arm by operation of suitable control levers mounted on the head. The column is clamped radially in adjusted position in the present instance by a lever 16 mounted upon the drill head and connected by suitable means to the vertical clamp shaft 17 which extends parallel with the column, with its lower end in operating connection with the column clamp mechanism.

It is to be noted at this point that the column clamp operating shaft 17 may either be coupled directly to the hand lever 16 for manual operation or it may be actuated by power means such as hydraulic or electrical actuating devices. Also in certain types of machines, the column clamping mechanism is operated manually by a clamp lever connected directly to the shaft 17 at the base of the column instead of operating from the drill head, as disclosed.

Figure 4:
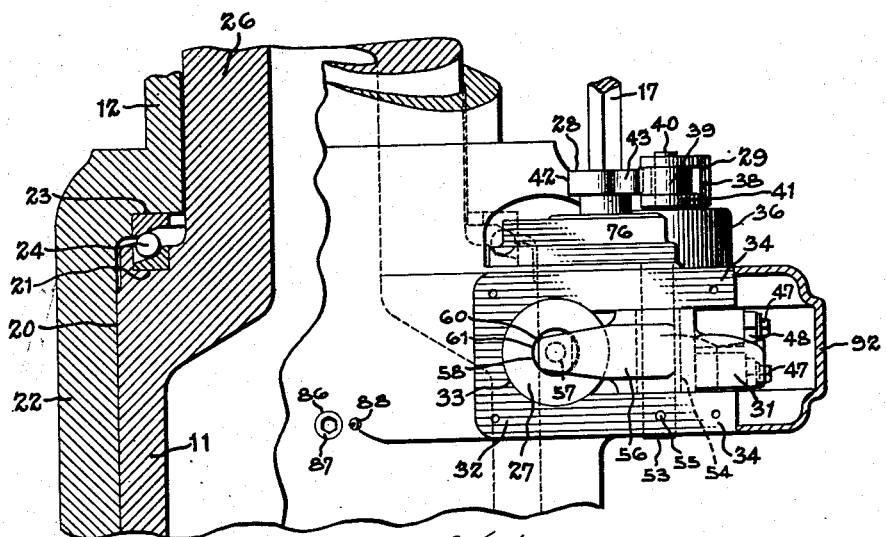
Figure 4 is an enlarged fragmentary view partially in section, taken at right angles to Figure 3 with the end cover plate removed to show the relationship of the clamping shoe and lever.

As shown in Figures 3 and 4, the stump 11 is counter-turned as at 20 to provide a shoulder 21 and the column includes the usual hub 22, rotatably fitted over the counter-turned portion 20 and providing a shoulder 23 above the stump shoulder 21. Between stump shoulder 21 and hub shoulder 23 there is interposed a ball thrust bearing 24 which provides an anti-frictional support for the column; also the stump preferably includes a stabilizing post 26 passing upwardly through the inside diameter of column 11, including at its upper end a bearing (not shown) which stabilizes the upper portion of the column against lateral deflection. Thus, the column is freely rotatable upon the stump so that the arm, which is non-rotatably keyed to it, may be swung radially to various positions relative to the work pieces, while the clamping mechanism operates to clamp the column to the stump in adjusted position.

The column hub portion 22 is clamped with respect to the stump by means of a pair of cylindrical wedging shoes 27—27 which are slidably sustained in the hub. Their inner ends are machined to form wedge-like facial portions arranged to establish a frictional engagement with the counter-turned stump portion 20 when the clamp mechanism is actuated. These shoes are thrust inwardly toward each other upon rotation of shaft 17 by operation of a cam 28 which actuates a primary lever 29 which in turn actuates an intermediate lever 30 operatively connected to the cylindrical wedging shoes 27—27 by means of secondary levers 31—31.

Described in detail, the hub 22 of the column includes a box-like housing 32 formed preferably as an integral part of the hub; the hub and its housing being a one-piece casting which is suitably machined where necessary to provide bearing surfaces and being bored to journal the cam shaft 17, the primary lever 29, intermediate lever 30 and the secondary levers 31—31. A lateral bore 33, adapted to slidably journal the cylindrical shoes 27—27, is formed in the hub at right angles to the vertical axis of the stump, the axis of the bore being generally tangent to the periphery of the stump. By this arrangement the clamping elements are all confined within the housing and the clamping forces are localized by the housing. Thus, a rugged, self-contained unit is provided which is capable of clamping the column rigidly to the base to prevent deflection and loss of accuracy under heavy working stresses.

As best shown in Figures 3 and 4, the housing 32 constitutes a pair of spaced flanges 34—34 of heavy metal, with the secondary levers 31—31 pivotally mounted between them. The primary lever 29 is mounted above the housing and includes a vertical shaft 35 which is journalled in bosses 36—36 formed on the upper and lower flanges 34—34, the shaft being secured against endwise displacement by a collar 37 fastened to its lower end. The swinging end of lever 29 is bifurcated as at 38 and a cam roller 39 is journalled at the swinging end upon a stub shaft 40 secured against endwise displacement by means of the pin 41. Roller 39 is tracked against the cam 28 which has a concentric major circumference 42 forming a clamping radius and a relieved portion 43 for clamp release. In the position indicated in Figure 2, the cam is in clamping position with respect to roller 39, and to release the column clamp, the cam is rotated in a counter-clockwise direction to bring its recessed area 43 into alignment with the roller.

As above noted, clamping pressure is transmitted from primary lever 29 to the secondary levers 31—31 through the intermediate lever 30 (Figure 3) which is located between the spaced flanges 34—34, being keyed as at 45 to a counter-turned portion 46 of shaft 35. The swinging end of intermediate lever 30 is operatively connected in common to the swinging ends of the secondary levers 31—31 by means of respective set screws 47—47 screwthreaded through the ends of the levers 31—31 and locked in adjusted position by lock nuts 48. Since each secondary lever 31 is provided with an individual adjusting screw 47, each lever is adjustable individually to provide balanced clamping pressure and to compensate for wear which may occur after prolonged service between the shoes and stump and between the various other bearing surfaces of the mechanism. The inner end of each adjustment screw is engaged against the swinging end of lever 30 through a hardened bearing ball 50 (Figure 2) interposed between the lever and head 51 formed at the inner end of the adjustment screw. The levers and screw heads each include complementary spherical recesses for seating the bearing ball.

The connection of the secondary levers 31 to the wedging shoes 27 is in duplicate for the respective shoes; therefore, a description of the mechanism for one shoe applies to both and duplicate numerals indicate like parts. Each lever 31 is mounted upon a stub shaft 53 which passes through the flanges 34—34 (Figure 2) providing a stabilized pivotal bearing, the lever preferably including bushings 54 for this purpose. Each pivot pin is fixed against rotation and endwise displacement by a set screw 55 threaded through the lower flange 34, as shown in Figure 4. Each lever 31 includes a relatively short pressure arm 56 extending beyond the fulcrum shaft 53 substantially at right angles to the axis of the wedging shoes 27 as shown in Figure 2, and a connection is established between the end of the shoe and lever by a bearing ball 57.

It is to be noted, at this point, that the bearing balls 50 are located at the axial centers of the shoes in order to centralize the application of pressure and thereby to prevent binding of the shoes in their bores. This arrangement also permits the cylindrical wedging shoes to rotate slightly with respect to the arms 56 so that the shoes float relative to their bores to equalize wear and to minimize resistance. The clamping shoes 27 preferably are formed from metal which is softer than the stump and column to prevent scoring of the stump; thus, wear is concentrated upon the shoes which may be replaced readily if they become worn after prolonged service.

Each bearing ball 57 is seated in a hardened insert disk 58 which, in turn, resides in a cylindrical recess 60 formed in the end of the shoe. As indicated at 61 in Figure 2, there is provided circumferential clearance between the recess and disk to permit a limited amount of lateral displacement of the disk with respect to the shoe as the pressure arm swings to clamping position. In other words, a change in the angular position of the arm in clamping or unclamping will cause lateral shifting between the disk and shoe; therefore, the disk floats laterally in accordance with movements of the lever arm without binding and further reduces operating resistance.

It will be observed that the system of levers connecting cam 28 to the wedging shoes is a compound one which provides one increase in leverage from primary lever 29 to the intermediate lever, and a second increase from the intermediate lever to the secondary levers so that a high degree of wedging pressure is transmitted to the wedging shoes. The spaced flanges 34—34, which delineate the clamping housing 32, are cast as an integral part of the column hub with the intermediate and secondary levers compactly arranged within the housing and with the cam and primary lever mounted upon the top of the housing. The secondary levers are relatively short and stiff and by the provision of the rigid spaced flanges 34, their stub shafts 53 are stabilized laterally to prevent binding and wear under the heavy clamping pressures imposed upon them by the primary lever. The forces reacting against the levers in clamping are thus absorbed in balance by the spaced flanges.

The compound reduction leverage system so provided is quite compact but produces exceedingly high clamping pressures in proportion to its size. All the parts including the clamping shoes themselves are confined within the integral casting constituted by the flanges and adjoining metal sections. This produces an exceptionally rigid clamp structure which resists deflection under operating stresses and is capable of heavy service without undue wear or loss of efficiency.

Wedging action between the shoes and stump is developed by a wedging face 62 which is machined at the inner ends of the shoes on a radius corresponding to the periphery of the stump. The clamping shoes are mounted in the hub portion of the column with their axes at a tangent to the periphery of the stump; consequently clamping movement of a given shoe against the stump reacts against the hub to generate a turning force relative to the stump. By virtue of the simultaneous actuation of the levers 31—31 however, both clamping shoes are urged simultaneously toward each other when shaft 17 is rotated to clamping position, hence any tendency for one shoe to cause creeping of the column with respect to the stump is opposed by an equal force in the opposite direction. It will also be observed that the wedging action of the shoes causes them to be urged laterally in their bores so that any wear which occurs either diametrically or along the wedging faces 62 can readily be taken up by adjustment of the screws 47.

The wedging action of the shoes against the stump by operation of the inclined faces 62 produces a powerful and tenacious gripping force which holds the column rigidly in adjusted position. In order to provide this desirable rigidity and at the same time to prevent actual seizure of the shoes, a compression spring 67 (Figure 2) is interposed between the adjacent inner ends of the clamping shoes to urge the shoes normally toward unclamping position. When the shoes are unclamped, the compression spring forces them apart and thereby provides positive disengagement of the column.

In order to accommodate the spring, the ends of the shoes are spaced from one another and pins 68—68 project from the ends of the shoes toward one another and pass through the spring from opposite ends to hold it in place. An operating clearance, indicated at 70, is maintained between the adjacent inner ends of the pins; this clearance being sufficient to allow the shoes to move toward one another without interference to the clamping position shown. Each pin 68 preferably is pressed into an axial bore 71 formed in the shoe, the outer end of each bore 71 being tapped to receive a flat head screw 72 which resides beneath the hardened disk 58.

The spring 67 is quite heavy and is preloaded sufficiently to counteract the tendency of the clamping shoes to remain wedged against the stump after their levers release them. In the embodiment disclosed, the spring exerts a pressure of approximately two hundred pounds against the shoes in unclamping direction. This force is found adequate to force the shoes out of engagement when the levers move to unclamping position and thereby prevents sticking or self-wedging of the shoes when clamping pressure is relaxed. It will be understood that the spring load is increased or decreased according to the size of the parts so as to correspond to the requirement of the various machines. The amount of spring deflection from clamping to unclamping position is relatively slight, and by virtue of the compound reduction lever system, the bias effect of the spring has no appreciable effect on operating resistance.

Figure 5:
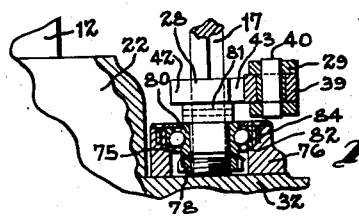
Figure 5 is a fragmentary sectional view taken on line 5—5, Figure 2, detailing the mounting of the cam by which the clamping force is transmitted from the actuating shaft to the clamping mechanism.

As shown in Figure 5, the lower end of shaft 17 is journalled in a ball bearing 75 which is seated in a bearing block 76 secured by screws 77 to the upper flange 34. Cam 28 is secured upon the shaft 17 against endwise displacement by a nut 78 screwthreaded upon the lower end of the shaft and clamping the inner race 80 of bearing 75 against the hub 81 of the cam. The outer race 82 of the bearing is secured against endwise displacement by a cover plate secured by screws 84 threaded into bearing block 76.

Controlled turning resistance is maintained constantly upon the column in order to hold it by friction in adjusted position prior to actuation of the clamping mechanism as previously noted. Friction drag is developed by a pair of braking plugs 85—85 slidably mounted in tapped holes 86—86 drilled at diametrically opposite sides through the column hub (Figures 2 and 6). The inner ends of plugs 85 are frictionally engaged against the periphery of the stump by means of set screws 87—87 which are threaded into the outer ends of the holes 86. The set screws preferably are of the conventional socket head type and are adjusted by a standard wrench to force the brake plugs at controlled pressure against the stump and thereby to furnish the required braking action.

The set screws 87 are locked in adjusted position by respective lock screws 88 confined in small tapped holes 90, angularly related to and communicating with the holes 86. A locking plug 91 is interposed between the set screw 87 and lock screw 88 to lock the set screw in adjustment after it is properly set. The lock screws are of the socket head type, similar to the set screws, and are loosened before adjusting the set screws.

The brake arrangement permits the machine to be adjusted either to a loose or tight condition according to the type of work or to suit the operator. The turning resistance so provided serves a twofold purpose; it aids in preventing column creep during clamping movement of the shoes and it permits small holes to be drilled without clamping the column when the arm is shifted from hole to hole. The force applied by the respective levers 31 is balanced precisely by the adjustment screws 47, and the balancing of force in conjunction with the brake plugs 85 eliminates column creep during clamping.

The brake plugs provide a constant drag upon the column without undue wear because the actual surface travel of the stump periphery with respect to the plugs is slight. Should wear eventually become manifest after prolonged service, it is a simple matter to loosen the lock screws and readjust the set screws.

As best shown in Figure 2, the clamp housing is provided with a front closure plate 92 which is secured in position by screws 93 threaded into the flanges 32—32. The ends of the clamping shoe bores are also closed by plates 94—94 secured by screws 95. These closure plates completely seal off the moving parts and protect them from excessive wear caused by dirt and grit and are easily removed when service or adjustment so requires.

It will be evident from the foregoing description, that the compound lever system, applying pressure through the low resistance bearing balls and floating disks, will produce a powerful clamping thrust against the clamping shoes and clamp the column rigidly. The leverage so developed is sufficient to compress the stiff compression spring without noticeable opposition, while on the other hand, the force stored in the spring is more than sufficient to retract the shoes when pressure is relieved. Thus, the leverage system produces adequate clamping pressure without requiring undue force upon the hand lever, and due to low friction losses, does not interfere with the operation of the compression spring in freeing the shoes when leverage pressure is relieved. Reliable clamping and unclamping is thus produced, while the operation of the braking plugs applies the necessary constant drag resistance to the column, making it unnecessary to loosen the column by force in order to reposition it after unclamping.

It is to be noted that the clamp structure without substantial change, can be applied also to the arm of the drill for clamping the arm to the column. In this instance, the split arm portion which embraces the column is made solid and there is provided an integral clamp housing substantially the same as applied to the lower end of the column. In its capacity as an arm clamp the mechanism will produce the same improvements in performance as disclosed in its column clamping function.

I claim:

1. In a machine tool having a movable member and a cylindrical support for the movable member; a mechanism for clamping the movable member with respect to the cylindrical support comprising, an annular casting on the movable member loosely embracing the cylindrical support, the casting having a transverse bore intersecting the periphery of the cylindrical support and having a clamp housing adjacent the said bore, a pair of cylindrical wedging shoes slidably mounted within the bore and engageable with the cylindrical support on opposite sides thereof, a compound reduction lever system pivotally mounted within the clamp housing, the lever system having a pair of levers engaged against the outer ends of the wedging shoes and adapted to force the shoes inwardly toward one another into wedging engagement with the cylindrical support, means for actuating the lever system to cause movement of the shoes to clamping positions, and a compression spring in said transverse bore interposed between the inner ends of the wedging shoes and arranged to force the same outwardly counter to the force applied by said lever system, said compression spring being adapted to disengage the wedging shoes with respect to the cylindrical support upon actuation of the lever system to unclamping position.

2. In a radial drill having a cylindrical stump and a column rotatably mounted upon the stump; a mechanism for clamping the column with respect to the stump comprising, an annular hub formed at the lower end of the column rotatably journalled upon the stump, the said hub having a transverse bore intersecting the periphery of the stump and having a clamp housing extending exteriorly of the hub adjacent the said bore, a pair of wedging shoes slidably mounted within the bore having their inner ends spaced from one another and having facial portions arranged to establish a wedging engagement with the stump at opposite sides thereof, a compound reduction lever system pivotally mounted within the clamp housing, the lever system having a pair of shoe actuating levers engaged against the outer ends of the clamping shoes adapted to force the shoes inwardly toward one another, actuating means common to both of said levers for operating the same in unison in clamping direction, and brake plugs slidably mounted within the annular hub and engaged frictionally against the stump to prevent rotary creeping of the column, said brake plugs being effective when said wedging shoes are released.

3. In a machine tool having a movable member and a cylindrical support for the movable member; a mechanism for clamping the movable member with respect to the cylindrical support comprising, an annular casting on the movable member embracing the cylindrical support, the casting having a transverse bore intersecting the periphery of the cylindrical support and having a clamp housing adjacent the said bore, a pair of wedging shoes slidably mounted within the bore and engageable with the cylindrical support on opposite sides thereof, a compound reduction lever system pivotally mounted within the clamp housing, the lever system including a pair of levers engaged against the outer ends of the wedging shoes arranged to force the shoes inwardly into wedging engagement with the cylindrical support, means for actuating the lever system to cause movement of the shoes to clamping and unclamping positions, a compression spring in said transverse bore interposed between the inner ends of the wedging shoes and arranged to urge the shoes outwardly counter to the levers, and braking elements mounted in said casting and engaged frictionally against the cylindrical support to provide a constant frictional drag with respect to the cylindrical support when the wedging shoes are unclamped.

4. In a machine tool having a movable member and a cylindrical support member, a mechanism for clamping the movable member to the support member comprising, an annular hub on the movable member, the hub having a transverse bore intersecting the cylindrical support member and having a clamp housing adjacent the transverse bore, opposed clamping shoes slidably mounted in said transverse bore adapted to establish a wedging engagement against the periphery of the cylindrical support, respective levers pivotally mounted within the clamp housing having respective swinging arms extending beyond their pivot points and engaged against the outer ends of the clamping shoes, means for actuating said levers to cause movement of the shoes to clamping and unclamping positions, the outer ends of the shoes each having a recess formed therein, respective disks loosely seated within said recesses adapted to shift laterally in response to the movements of the swinging arms, and respective bearing balls interposed between the disks and arms to transmit the pressure developed by the arms to the disk whereby lateral shifting of the disks accommodates the angular movements of the swinging arms.

5. In a machine tool having a movable member and a cylindrical support; a mechanism for clamping the movable member with respect to the cylindrical support comprising, an annular hub on the movable member embracing the cylindrical support, a pair of opposed wedging shoes slidably mounted within the annular hub, the shoes constituting cylindrical members rotatably mounted within a bore which intersects the periphery of the cylindrical support, the inner ends of the shoes having facial portions adapted to establish a wedging engagement against the support when the shoes are forced inwardly toward one another, respective clamping levers pivotally mounted with respect to the movable member and having end extensions engageable with the opposite outer ends of the shoes to force the same into clamping engagement with the cylindrical support, bearing balls interposed between the ends of the shoes and levers on the central axis of the cylindrical shoes and arranged to provide a rotatable connection between the levers and wedging shoes whereby the shoes are free to float with respect to their bores, and means for actuating the said levers simultaneously to apply an equal clamping pressure against respective shoes so that the clamping pressure developed by one shoe is opposed by the clamping pressure developed in the opposite direction by the other shoe.

6. In a machine tool having a movable portion and a cylindrical support member for mounting the movable portion; a clamp for securing the movable portion in adjusted position with respect to the support member comprising, a pair of clamping shoes slidably mounted within the movable portion on an axis which is disposed at right angles to the axis of the cylindrical support member, the said shoes having their inner ends spaced from one another and having facial portions adjacent their inner ends providing wedging surfaces for engagement against the periphery of the cylindrical support member, a housing formed on the movable portion adjacent the clamping shoes, a pair of clamping levers pivotally mounted within the said housing at opposite ends thereof, each of said levers having an end extending beyond its pivot point and engaged against the outer ends of the respective clamping shoes, the opposite ends of said levers being disposed adjacent one another within a central portion of the housing, an actuating lever pivotally mounted within the housing and in engagement with the said adjacent ends of the clamping levers to actuate the same in unison upon movement of the actuating lever, the said clamping levers and actuating lever constituting a compound lever system operable to force the clamping shoes in unison into pressure engagement against the cylindrical support member, and a spring element interposed between the spaced inner ends of the clamping shoes operable to shift the shoes to disengaging position when the compound lever system is released.

References Cited in the file of this patent

UNITED STATES PATENTS

| Number | Name | Date |
|---|---|---|
| 129,628 | Tweedle | July 16, 1872 |
| 437,091 | Carr | Sept. 23, 1890 |
| 1,022,439 | Norris | Apr. 9, 1912 |
| 1,231,078 | Sill et al. | June 26, 1917 |
| 2,174,409 | McCune | Apr. 26, 1939 |
| 2,436,136 | Baselt | Feb. 17, 1948 |